(12) United States Patent
Sherman

(10) Patent No.: US 12,523,593 B2
(45) Date of Patent: Jan. 13, 2026

(54) SUPER RESOLUTION IMAGING OF CELL-CELL INTERFACE

(71) Applicants: Eilon Sherman, Mevaseret-Zion (IL); Menachem Sherman, Ramat Gan (IL)

(72) Inventor: Eilon Sherman, Mevaseret-Zion (IL)

(73) Assignee: Menachem Sherman, Ramat Gan (IL)

( * ) Notice: Subject to any disclaimer, the term of this patent is extended or adjusted under 35 U.S.C. 154(b) by 76 days.

(21) Appl. No.: 18/274,170

(22) PCT Filed: Jan. 26, 2022

(86) PCT No.: PCT/IL2022/050114
§ 371 (c)(1),
(2) Date: Jul. 25, 2023

(87) PCT Pub. No.: WO2022/162659
PCT Pub. Date: Aug. 4, 2022

(65) Prior Publication Data
US 2024/0426737 A1    Dec. 26, 2024

Related U.S. Application Data

(60) Provisional application No. 63/141,642, filed on Jan. 26, 2021.

(51) Int. Cl.
*G01N 15/1434* (2024.01)
*G01N 1/31* (2006.01)
(Continued)

(52) U.S. Cl.
CPC ........ *G01N 15/1434* (2013.01); *G01N 1/312* (2013.01); *G01N 15/1456* (2013.01);
(Continued)

(58) Field of Classification Search
CPC .............. G01N 15/1434; G01N 1/312; G01N 15/1456; G01N 2015/1006;
(Continued)

(56) References Cited

U.S. PATENT DOCUMENTS 9,835,870 B2    12/2017  Astratov et al.
2002/0171799 A1*  11/2002  Bayrle ................ G02F 1/13392
                                                    349/155
(Continued)

OTHER PUBLICATIONS

International Search Report issued May 9, 2022 in International Patent Application No. PCT/IL2022/050114.

*Primary Examiner* — Md M Rahman
(74) *Attorney, Agent, or Firm* — Wood, Phillips, Katz, Clark & Mortimer

(57) ABSTRACT

The present technique provides a simple, cost-effective and robust method for re-alignment of interfaces between cell conjugates parallel to the coverslip. The technique is based on placement of two cell types, to subsequently form an interaction between the cell types, to opposing coverslips and then bringing them together before or during imaging, for either fixed or live cell imaging. Spacer particles having defined parameters control the z-separation and the relative lateral position of the opposing coverslips. We show that our method allows most types of super-resolution imaging.

17 Claims, 11 Drawing Sheets

(51) Int. Cl.
*G01N 15/10* (2024.01)
*G01N 15/14* (2024.01)

(52) U.S. Cl.
CPC ............ *G01N 2015/1006* (2013.01); *G01N 2015/103* (2024.01); *G01N 2015/1445* (2013.01); *G01N 2015/1452* (2013.01)

(58) Field of Classification Search
CPC ..... G01N 2015/103; G01N 2015/1445; G01N 2015/1452; G02B 21/36; G02B 21/34
USPC ........................................... 356/335
See application file for complete search history.

(56) References Cited

U.S. PATENT DOCUMENTS

| | | | |
|---|---|---|---|
| 2007/0161106 A1* | 7/2007 | Jervis | C12M 23/16 |
| | | | 435/375 |
| 2010/0167330 A1 | 7/2010 | Bhatia et al. | |
| 2010/0240041 A1 | 9/2010 | Matsunaga et al. | |
| 2012/0044493 A1* | 2/2012 | Smart | G01N 15/10 |
| | | | 356/336 |
| 2018/0156777 A1 | 6/2018 | Qin et al. | |
| 2019/0018169 A1* | 1/2019 | Aschwanden | H04N 23/55 |
| 2020/0103401 A1* | 4/2020 | Chou | B01L 3/502738 |
| 2020/0381103 A1* | 12/2020 | Froloff | G16H 30/40 |
| 2021/0162402 A1* | 6/2021 | Chou | G01N 1/2813 |
| 2022/0091303 A1* | 3/2022 | Kozakai | G02B 1/14 |

\* cited by examiner

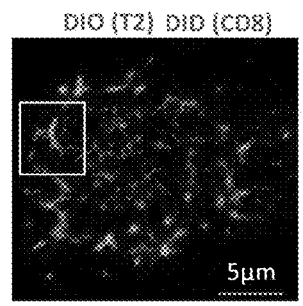
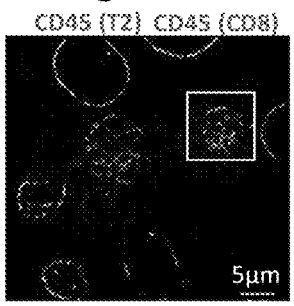
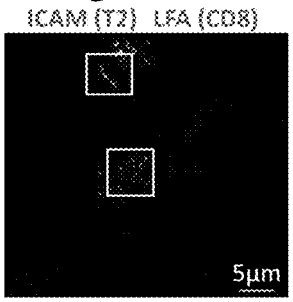
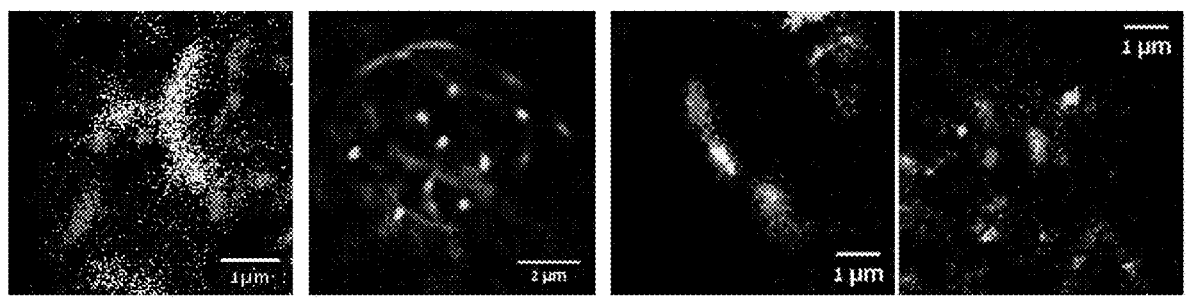
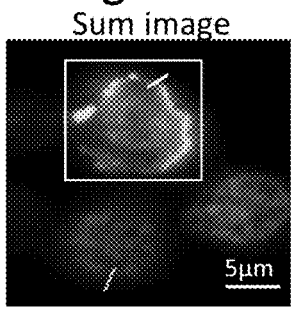
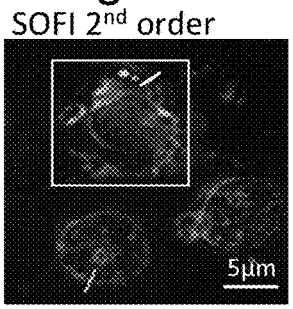
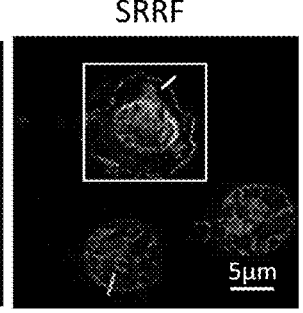
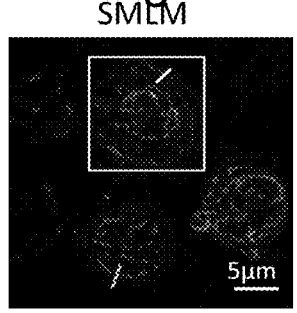
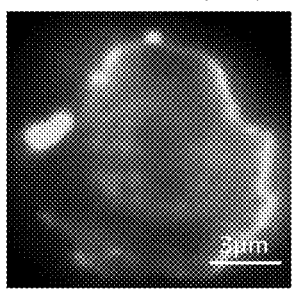
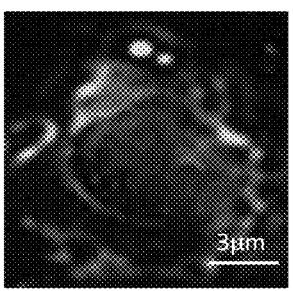
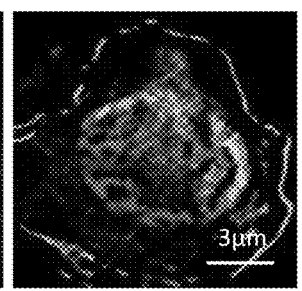
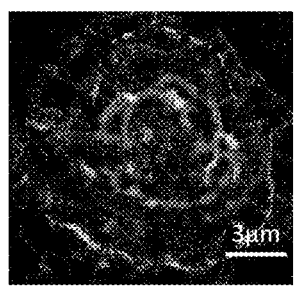

Fig. 8A
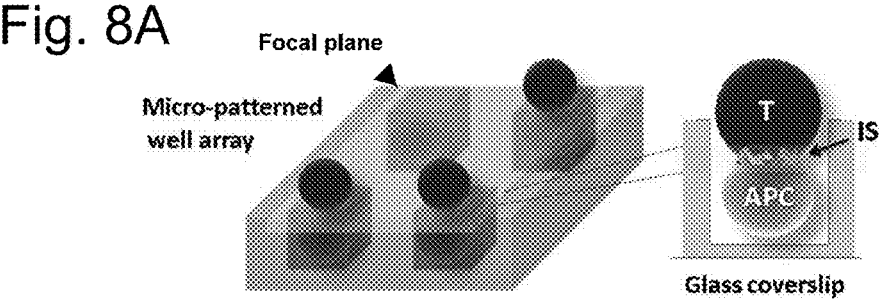
Fig. 8B
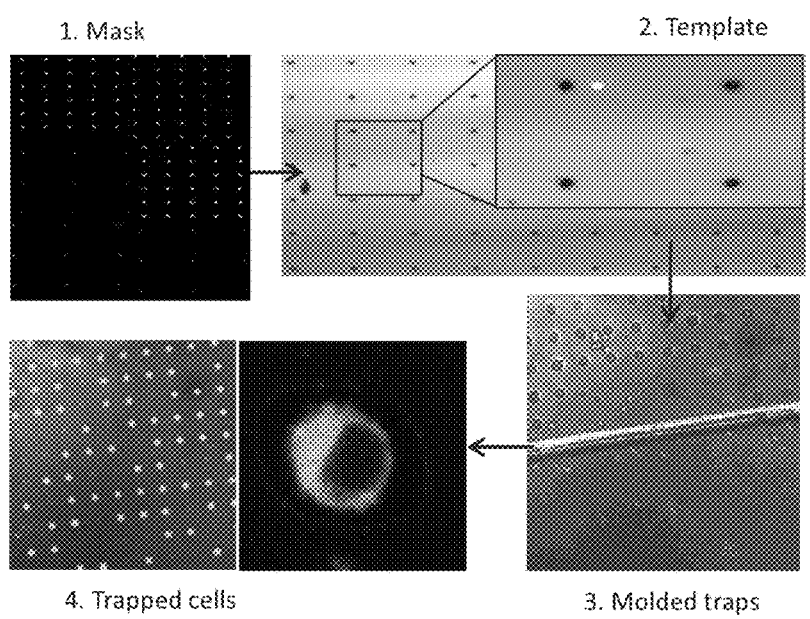
Fig. 8C Confocal
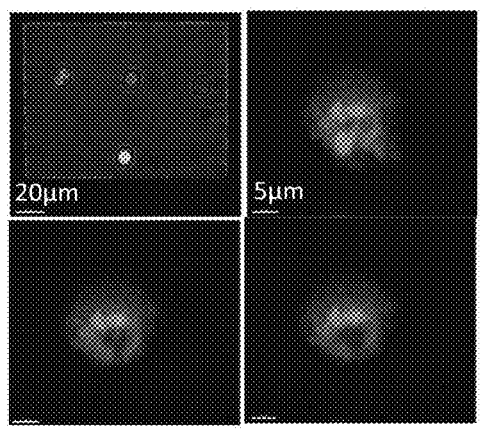
Fig. 8D STED
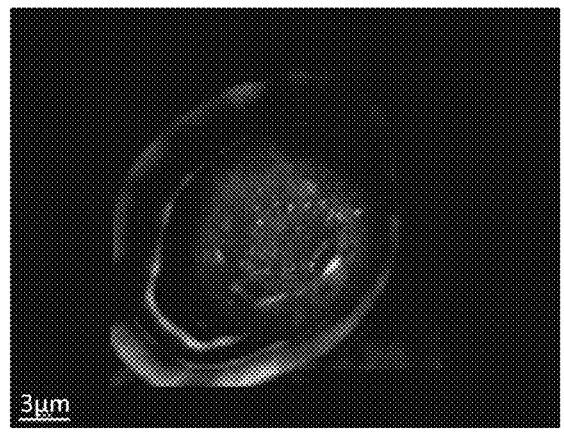

Fig. 9A
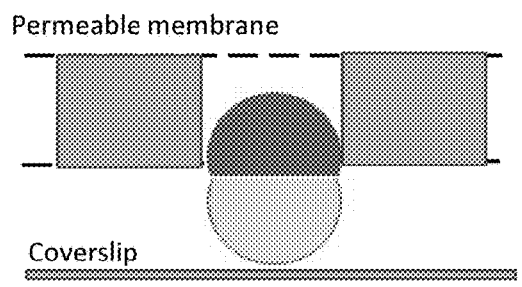
Fig. 9B
SEM
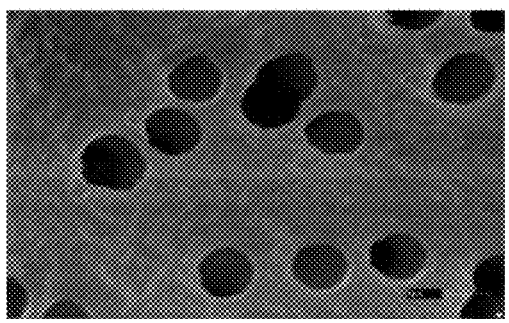
Fig. 9C
Confocal
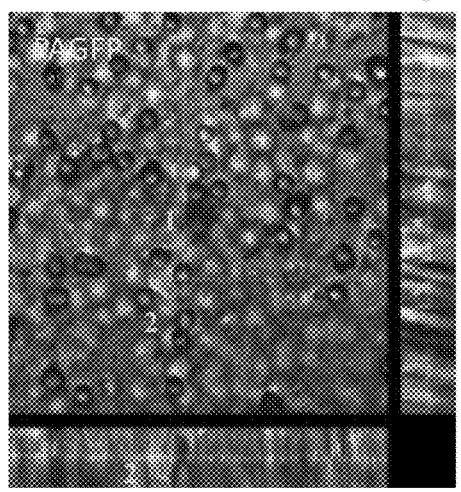
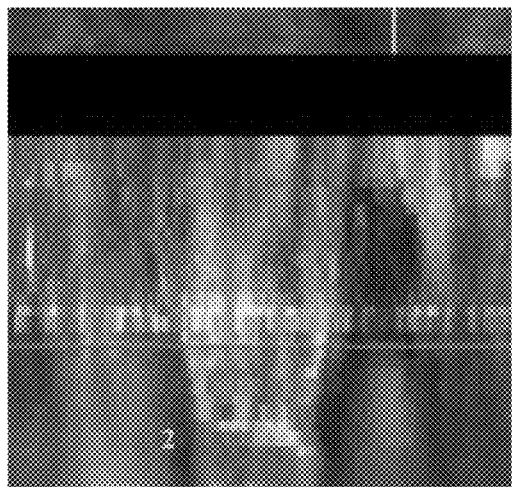
Fig. 9D
Confocal
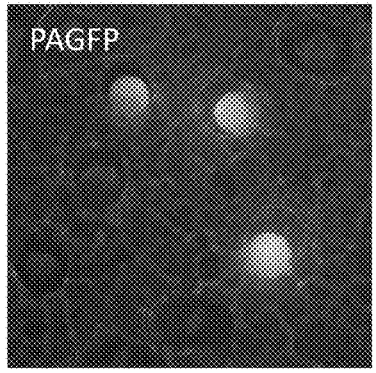
Bright field
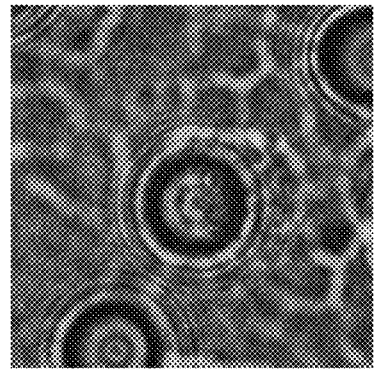
Fluorescence
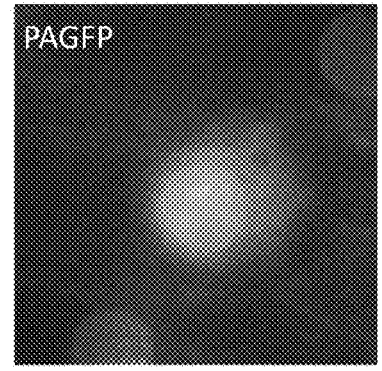

Fig. 11A
Sum image
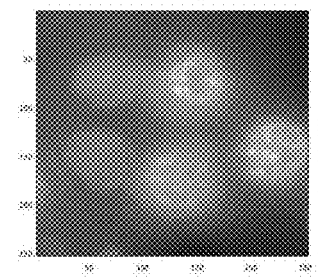
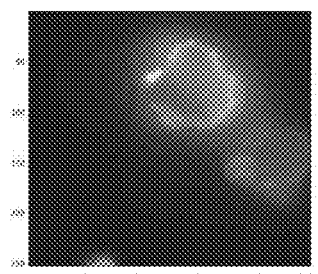
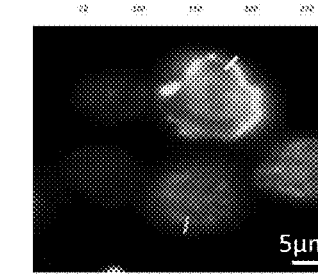
Fig. 11B
SOFI 2nd order
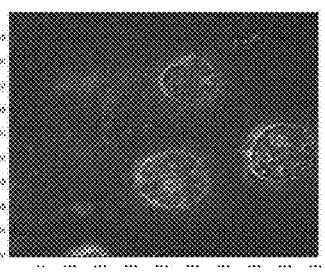
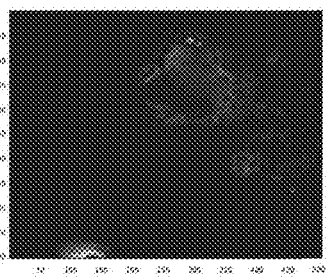
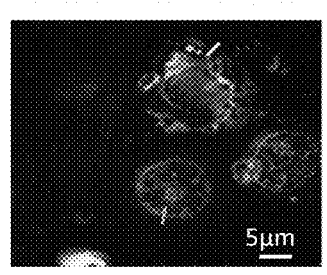
Fig. 11C
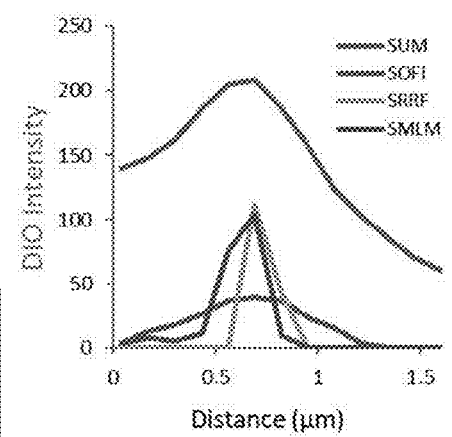
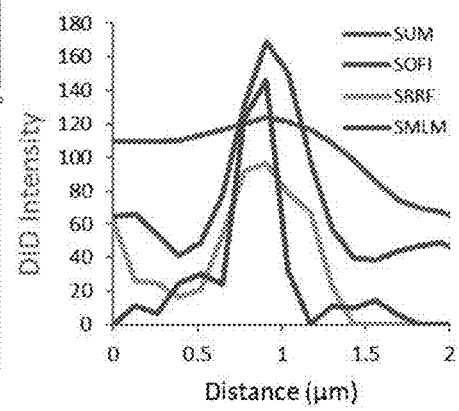
Fig. 11D
Diffraction-limited | SMLM | Filtered SMLM
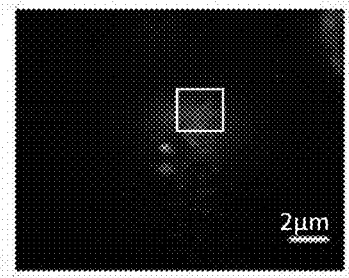
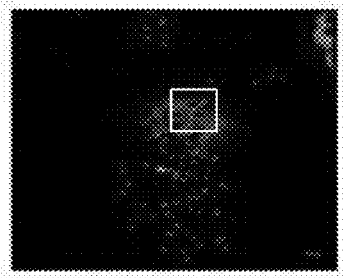
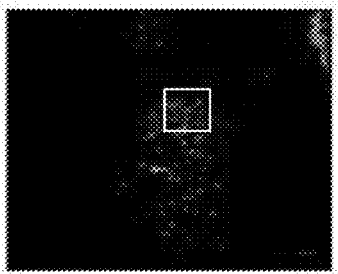
CD45 (CD8), CD45 (T2)

SUPER RESOLUTION IMAGING OF CELL-CELL INTERFACE

TECHNOLOGICAL FIELD

The present invention relates to technique for use in imaging of cells and interactions between cells.

BACKGROUND

Multicellular organisms depend on cellular interactions for their structure and function. Physical interactions between cells serve for mechanical support in tissue formation, convey chemical and mechanical information and facilitate nutrient exchange between the touching cells. Examples of contacts include a wide range of cellular junctions, neuronal synapses, and various types of immune synapses. While structural contacts are relatively static and persist over days, synapses often demonstrate much faster dynamics, sometimes forming within seconds.

Diffraction limited optical microscopy has been employed for detailed imaging of cell-cell interfaces, molecular interaction within and their dynamics. More recently, multiple approaches for super-resolution microscopy (SRM) have been introduced, including (but not limited to) single molecule localisation microscopy (SMLM: such as Photoactivated Localization Microscopy (PALM) or Stochastic Optical Reconstruction Microscopy (STORM)), Stimulated Emission Depletion (STED), Structured Illumination Microscopy (SIM) and their variants. These methods break the diffraction limit of light, and can reach lateral resolutions of 20-30 nm. SRM has already revealed multiple nanoscale entities that play a crucial functional role in cell function. Such entities include membrane ruffles, protein clusters, protein-lipid domains, vesicles and more. Still, for most SRM approaches, as for diffraction-limited microscopy, the resolution in the z-direction is much worse than in the x-y plane and its enhancement requires introducing more sophisticated components to the imaging system. Thus, SRM of cell conjugates has suffered lower resolution due to the non-optimal orientation of the imaged cell-cell interface.

Compared to diffraction-limited microscopy, SRM poses more stringent requirements for imaging. For instance, SRM methods are often highly sensitive to optical aberrations and mechanical vibrations. Moreover, they often require a very low background, especially for SMLM. They further require excellent stability (movements <20 nm/(pixel dwell time)). Otherwise, common requirements shared with diffraction-limited microscopy include compatibility with multi-colour imaging using existing systems (fluorophores, excitation lasers, detectors, etc.). Deconvolution of either diffraction-limited microscopy or SRM further increases these sensitivities, as the point-spread function (PSF)[13] is usually known and constant.

GENERAL DESCRIPTION

There is a need in the art for a novel technique enabling high and improved resolution imaging of interaction between different materials, such as organic materials, inorganic materials, synthetic materials, biological material or in a specific realization of the technique, cell to cell interface or interaction.

It is to be noted that throughout the application, the term "interface" can be used interchangeably with term "interaction". These terms refer to any interface or interaction that can be identified in any type of imaging. For example, this can include, and not limited to, the 3D shape or arrangement of each of the interacting cells, dynamic changes in this shape before, along and after the interaction, the organization and shape of subcellular organelles and entities within the cells (e.g. nucleus, mitochondria, cytoskeleton, plasma membrane), organization of molecules within the cells and on their surface (e.g. integrins, receptors and ligands), changes in cell metabolism, cell mobility and arrest upon interaction, etc.

The present technique enables selectively collecting image data indicative of interface between selected specific cells or materials. The technique may further enable active selection of specific cells, and may also provide physically obtaining them, to elect individual cells by utilizing image data and selection criteria based on one or more interaction parameters between specific cells. Such obtained cells may be used in one or more clinical research processes and/or in clinical treatment, e.g. for immunotherapy by selecting specific cells that provide effective immune reaction with cancer cells for example in adoptive T-cell transfer uses.

Over the past decades, optical microscopy has revealed a wealth of information regarding the structure and dynamics within such cell-cell interfaces. Unfortunately, the resolution of optical microscopy has been typically limited by diffraction. In a typical microscopy configuration, an x-y plane can be defined perpendicular to the optical axis. In this plane the resolution is limited to $dr_{x-y} \sim \lambda/2NA$, where $\lambda$ is the wavelength of imaging and NA is the numerical aperture of the objective. Moreover, along the optical (z) axis resolution is further decreased as $dr_z = 2\lambda/(NA)^2$. Typical fluorescence imaging in the visible (green) range yields $dr_{x-y} \sim 170$ nm and $dr_z \sim 500$ nm. Since the interface between cell conjugates often lies perpendicular to the coverslip (i.e. along the z-axis), its features have been typically resolved in the worst orientation. Moreover, imaging the entire volume of cell conjugates typically requires too much time for live cell imaging of dynamic processes using conventional confocal microscopes. Likewise, sectioning across the vertical interface is slow, because most confocal microscopes are capable of much faster horizontal scanning (e.g. video rate at 30-60 fps), relative to their vertical scanning speed. Similarly, wide-field microscopes have slow vertical imaging speeds relative to horizontal imaging. Thus, imaging the interface along a single z-plane (or a limited number of planes) could result in faster imaging and improved spatial resolution.

The present technique provides a simple, cost-effective and robust method for re-alignment of interfaces between cell conjugates parallel to the coverslip. The technique is based on attachment of each of the two cell types, for subsequently form the interaction, to opposing coverslips and then bringing them together before or during imaging, for either fixed or live cell imaging. Spacer particles having defined parameters control the z-separation and the relative lateral position of the opposing coverslips. We show that our method allows most types of super-resolution imaging.

The present technique demonstrates the utility and performance via imaging of the immune synapse (IS) between fixed and live T cells and Antigen Presenting Cells (APCs) or melanoma cells. Such IS's are an outstanding example of a cell conjugate that has critical importance in human health. The specific and sensitive recognition of foreign antigens is performed by the T cell antigen receptor (TCR). Such recognition initiates a signaling cascade in the T cell, resulting in multiple effector functions. The TCR signal is carefully regulated, since its over-reactivity may cause autoimmunity and graft rejection, while TCR reactivity that is too weak may cause anergy (i.e. lack of required response).

In spite of the importance of TCR activation to human health, its detailed underlying mechanisms have not been fully resolved. Diffraction limited microscopy has shown that the TCR and downstream effectors form pronounced clusters and that TCR triggering and $Ca^{++}$ influx occur within seconds of first engagement of TCRs with cognate antigens. Results from super-resolution imaging of these clusters have shown that the TCR and related signaling molecules come together in nanoclusters that can form dynamic and heterogeneous functional nanoscale patterns. Importantly, unexplained localized and synchronized activation of TCRs within larger TCR clusters has been observed. Another type of molecular patterning at the IS involves the physical separation of engaged TCRs from bulky glycoproteins in tight contacts.

We show the compatibility of the present approach with multiple diffraction-limited and SRM imaging modalities, including bright-field, confocal and STED imaging, direct STORM (dSTROM), Super-resolution Optical Fluctuation Imaging (SOFI), and Super-Resolution Radial Fluctuations (SRRF). In addition, our technique can be used in large-scale microscopy to allow efficient scanning of multiple interacting cells. We further critically assess the pros and cons of our approach relative to current techniques for cell trapping, highlighting its superiority in stability, simplicity, wide compatibility with various microscopes, and very low background. The properties of our method allow the wide-spread use of high-quality diffraction-limited and super-resolution imaging of intercellular interfaces by enabling routine imaging using standard and advanced optical microscopes.

Another use case for the present invention in immunotherapy is to use a first cell or biological matter type that includes one or more of T cells, T cells expressing chimeric antigen receptors (CAR-T cells), Tumor infiltrating lymphocytes (TILs) and a second cell or biological matter type that includes one or more cancer cells with cognate surface antigens, cancer cells with no cognate surface antigens, patient-derived organoids, tumor organoids, antigen presenting cells (e.g. dendritic cells, B cells), Red blood cells, cell derived from body or animal tissues or biopsies. The second biological matter type may also include on-target and off-target molecules, such as glycans, proteins, bilayers, antibodies, synthetic polymers, drugs, etc.

The present invention may be further used for determining drug behavior by monitoring the cell-cell interaction before and after the addition (i.e. under the influence) of one or more drugs or small molecules (e.g. cytokines, chemokines, allergens, antigens, antibodies, bispecific antibodies, etc). The drugs may be added with a range of titrations for testing the effect on the interaction at different drug doses.

Thus, according to a broad aspect, the present invention provides a method for use in imaging biological material, the method comprising:

providing first sample comprising first type of biological cells on a first transparent plate;
providing second sample comprising second type of biological cells on a second plate; placing said first transparent plate facing said second plate such that cells of the first sample are directed toward the cells of the second sample: providing said first and second plate facing each other in a microscopy system for collecting one or more microscopic images indicative of interface between at least one cell of the first sample and at least one cell of the second sample.

It is to be noted that any combination of the described embodiments with respect to any aspect of this present disclosure is applicable. In other words, any aspect of the present disclosure can be defined by any combination of the described embodiments.

According to some embodiments, the second plate may be a transparent plate, or a semi-transparent plate. According to some embodiments, the second plate may be configured to be absorbing for light of one or more selected wavelength ranges. Generally, it is preferable that the second plate has low reflection properties.

According to some embodiments, the method may comprise providing one or more spacers between said first and second plates: said one or more spacers having an average diameter selected in accordance with sum of the diameters of biological cells of the first and second types.

According to some embodiments, the one or more spacers have substantially spherical shape, said spacers being configured for use as bearings, thereby allowing parallel relative translational shift of the first and second plates.

The translation of one plate with respect to the other is typically lateral movement of one plate with respect to the other. The translation results in a change of the alignment of one plate with respect to the other to obtain either a desired interaction between cells attached to the plates or to obtain a new desired imaging scheme.

According to some embodiments, the method may comprise varying relative translational location of said first and second plates to thereby electing specific cells of the first type interfacing specific cells of the second type.

In some embodiments of the method, the one or more spacers are mixed with one of said first and second biological cells, prior to their placement on the plate. The mixture may include one or more types of buffers or any liquid form that is suitable for containing the cells and the spacers. Therefore, when the mixture is placed on the respective plate, the cells and the spacers are placed simultaneously thereon. Thus, the method further comprising fixing or placing the mixture of the spacers and said first or second biological cells onto the first or second plate, respectively.

According to some embodiments, the method may further comprise processing said one or more microscopic images associated with one or more selected cells, determining one or more target cells having selected interaction parameters, and obtaining said one or more target cells for further use.

According to some embodiments, the method may further comprise use of said one or more target cells for use in diagnostics or medical treatment of a patient.

In some embodiments, the method further comprising placing or immobilizing the first type of biological cells on said first plate and immobilizing the second type of biological cells on said second plate. Namely, the method further comprising fixation of the biological matter that containing the cells on the plates to be used in the imaging.

In some embodiments of the method, at least one of said first and second plates is formed with pores for capturing or accommodating said first or second biological cells. At least one of the plates can be at least partially made of a porous material that is characterized with pores suitable to capture at least one type of cells that are used in the method.

According to one other broad aspect, the present invention provides a kit comprising a first transparent and a second plates and one or more spacers having selected diameter, said kit is adapted for use in imaging interface of biological cells: wherein diameter of said one or more spacers correspond to diameters of first and second types of biological cells for imaging interface between cells of the first and second types of biological cells.

According to some embodiments, the kit may further comprise instructions for imaging interface between cells of the first and second types of biological cells.

In some embodiments, the kit further comprising first and second types of biological cells to be fixed or placed on the first or second plates. The spacers are mixed with one of the first or second types of biological cells to define a cell-spacers mixture to be placed or fixed simultaneously on one of the plates.

In some embodiments of the kit, at least one of the first and second plates are formed with pores for trapping or capturing said first or second biological cells therein. At least one of the plates can be at least partially made of a porous material that is characterized with pores suitable to capture at least one type of cells that are used in the kit.

According to yet another broad aspect, the present invention provides a system comprising:
  at least one microscopic imaging unit comprising a sample mount; said sample mount being adapted for mounting an arrangement comprising a first and second plates separated by one or more spacers;
  a translation module adapted for selectively shifting said second plate with respect to said first transparent plate, thereby enabling selective imaging of interface between regions of first and second samples positioned on the first and second plates respectively. The shifting is typically performed by lateral movement of the one plate with respect to the other.

In some embodiments, the system may further comprise a cell obtaining module adapted for selectively obtaining one or more biological cells from said first transparent plate in accordance with image data indicative of interface between said one or more biological cells of said first sample and biological cells of said second sample.

In some embodiments, the system further comprising cells placement unit for placing or delivering the first and second types of biological cells onto said first and second plates, respectively. The placement unit can include various means for said placement, such as, but not limited to, pipetting, micro-pipetting, microfluidics, capillaries, etc. Placement may include mechanical, chemical or electrical adhesion of each of the cell (or biological material) types to each of the plates. This placement could be stable, transient, or reversible.

In some embodiments, the system further comprising said first and second plates mounted on said sample mount.

In some embodiments of the system, at least one of said first and second plates is formed with pores for trapping, accommodating or capturing biological cells used in the system. At least one of the plates can be at least partially made of a porous material that is characterized with pores suitable to capture at least one type of cells that are used in the system.

According to some embodiments, the system may further comprise a control unit for user-defined or automated sequence of performing the method, as defined according to any embodiment above, including image acquisition of cell-cell interface, cells selection, cells isolation and translation of the transparent plates relative to each other, and/or the field of view.

According to yet another broad aspect, the present invention provides a method for use in imaging of matter. The method comprising:
  providing first sample comprising first type of matter on a first transparent plate; providing second sample comprising second type of matter on a second plate: placing said first transparent plate facing said second plate such that matter of the first sample is directed toward the matter of the second sample: providing said first and second plates facing each other in a microscopy system for collecting one or more microscopic images indicative of interface between elements of the first and second types of matter. The first and second types of matter may be selected from: organic matter, inorganic matter, synthetic matter, biological cells, eukaryotic cells, mammalian cells, plant cells, tissues, tissue fragments, tissue cross-sections, bacteria, archaea, cell fragments, viruses, parasites, proteins, antibodies, lipids, carbohydrates, sugars, drug molecules, polymers, etc. The first and second matters that are used in the method should be capable of showing interaction with each other that is identifiable in imaging.

According to some embodiments, the method may comprise providing one or more spacers between said first and second plates: said one or more spacers having an average size (namely, height above one of the plates) selected in accordance with sum of the heights of the first and second types of biological materials, relative to their respective mounting plates.

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which:

FIG. 1A shows a schematic arrangement of cells according to the present technique, FIG. 1B shows Large scale microscopy images consisting of 100 fields of view were taken of $CD8^+$ cells in contact with T2 cells loaded with the activating peptide NY-ESO-1, FIG. 1C shows a zoomed brightfield and fluorescence images from the single field in panel B are shown at different heights (focal planes) relative to the cell interface. FIG. 1D shows Calcium imaging of Fluo-4 stained $CD8^+$ T cells, upon encounter with the T2 cells loaded with the activating peptide NY-ESO-1, FIG. 1E shows intensity time-trajectory of Fluo-4 in the pointed CD8+ T cell, and FIG. 1 shows time-dependent killing efficiency by $CD8^+$ T cells of the T2 cells, with (blue) or without (magenta) loading with NY-ESO-1 peptides:

FIG. 2A shows STED images of cell conjugates of $CD8^+$ cells with T2 cells loaded with the activating peptide NY-ESO-1, FIG. 2B is a three-dimensional rendering of the cell conjugates in FIG. 2A, FIG. 2C shows zoom images of the confocal and STED images are shown for the zoom area in FIG. 2A at z=0 (middle image), FIG. 2D shows STED images of cell conjugates of $CD8^+$ cells with A375 (melanoma) cells, FIG. 2E is a Three-dimensional rendering of the cell conjugates in FIG. 2D, and FIG. 2F shows zoom images of the confocal and STED images for the zoom area in FIG. 2D at z=0;

FIGS. 3A to 3G illustrate molecular organization at the IS captured by multiple super-resolution reconstruction techniques, FIG. 3A shows PM of the $CD8^+$ cells stained with DiD (red) and the PM of the T2 cells was stained with DiO (green), FIG. 3B exemplifies $CD8^+$ (red) and T2 (green) cells stained for CD45, FIG. 3C shows $CD8^+$ cells (red) stained for LFA, and T2 (green) cells were for ICAM, FIG. 3D to FIG. 3G show Super-resolution images of cell conjugates of $CD8^+$ cells with T2 cells loaded with the activating peptide NY-ESO-1: FIGS. 3A to 3C were reconstructed by the SMLM method of dSTORM. FIGS. 3D to 3G were reconstructed respectively by summing all images, SOFI, SRRF of dSTORM.

FIG. S1 shows large scale microscopy of T/APC cell conjugates on opposing surfaces in multiple height sections;

FIG. S2. Exemplifies trapping and imaging T/APC conjugates in a micro-patterned well array: FIG. S2A shows schematic description of the cell trapping approach in well arrays moulded in a polymer, FIG. S2B shows realization of the micro-patterned well traps, FIG. S2 shows preliminary confocal microscopy images of single T-cells (AND mouse) conjugated to APCs (B-cells loaded with PCC peptide) in 15 µm well traps, and FIG. S2D shows STED imaging of T/APC conjugates in micro-patterned traps:

FIG. S3 exemplifies trapping and imaging T/APC conjugates in a porous membrane, FIG. S3A shows a schematic description of Trapping and imaging T/APC conjugates in a porous membrane, FIG. S3B shows an SEM image of the porous membrane (top view), FIG. S3C shows a confocal imaging of trapped Jurkat cells in the porous membrane (shown are top and side views in the left and right images, respectively), and FIG. S3D shows: (left) Confocal, (middle) bright field and (right) fluorescence (both widefield) imaging of T cells, expressing PAGFP, and captured in a porous membrane:

FIG. S4 exemplifies localization accuracy of SMLM when imaging on opposing coverslips, FIG. S4A shows dSTORM images of CD8+ cells with T2 cells loaded with the activating peptide NY-ESO-1, FIG. S4B exemplifies localization accuracy of DiO and DiD; and FIG. S5 show sum images (FIG. S5A), and SOFI-reconstructed images (FIG. S5B) of the cell conjugates shown in FIGS. 3D and 3E, respectively: FIG. S5C shows intensity line profiles across distinct features in the images of FIG. 3D-G for Sum intensity rendering, SOFI, SRRF and SMLM reconstructions: FIG. S5D shows SOFI assisted SMLM reconstruction, of CD8+ and T2 cells loaded with the activating peptide NY-ESO-1.

DETAILED DESCRIPTION OF EMBODIMENTS

Figure 1A:
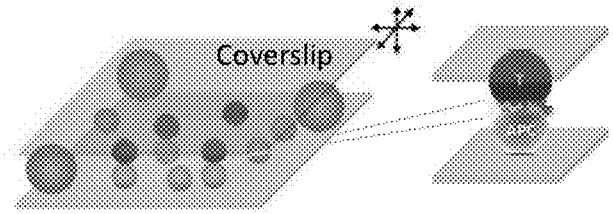
FIGS. 1A to 1F illustrate the present technique for Microscopy of T/APC conjugates on opposing surfaces.

The present technique provides a simple way for imaging cell-cell interfaces using SRM and large-scale microscopy. The present technique generally provides for capturing cells on two opposing coverslips to position the coverslips in respect to each other in a manner providing interface between the cells. As shown in FIG. 1A, cells of a first type are attached/adsorbed on a first transparent plate (or coverslip), and cells of a second type are attached/adsorbed on a second plate (or coverslip). The first and second plates are then positioned facing one another with a selected number of spacers between them. The spacers are generally selected as having effective spacing length being approximately diameters of the first and second types of cells (e.g. diameter for generally round spacers). In addition, the spacer is most optimally made of material that is optically transparent and compatible to living cells. It should be noted that the second plate may be transparent, semi-transparent or absorbing. Generally it is preferred that the second plate have low reflection properties. The microscopic imaging unit is generally used for imaging through the first transparent plate. Where the imaging focus, i.e. object plane, is set to be between the first and second plates.

For example, if cells of the first type have diameter x, and cells of the second type have diameter y, the spacers are selected with effective spacing length of x+y. FIG. 1A also exemplifies the coverslips being positioned one on the other, facing one another, providing that some cells interface between them. The interface plane is generally parallel to the coverslips plane, which is generally suitable to be positioned perpendicular to optical axis of an imaging/microscopy arrangement for imaging of the cell-to-cell interface.

In some configurations, the coverslips may be coated with selected reagents to promote cell adhesion to the coverslips. The reagents are selected in accordance with the cells used and may include antibodies against cell surface proteins (e.g. anti-integrins or anti-glycoproteins: αCD11, αCD45, as shown here) or lipid bilayers with adhering molecules (e.g. ICAM and CD28). In some embodiments of the present technique, each cell type is attached to a different glass surface. Prior to imaging, one cell-carrying surface (coverslip) is placed (upside down) on top of the second cell-carrying surface (coverslip). For instance, a small coverslip can be placed on top of cells in a glass-bottom chamber. To physically separate the two surfaces, an arrangement of one or more spacers (e.g. spherical silicon beads) are placed of one of the coverslips. The spacers are selected with a desired size that matches the length of the cell-cell conjugate. Synchronization of cell-cell encounter is primarily achieved by timing the placement of the surfaces, one on top of the other. Further synchronization can be achieved by sliding one of the opposing coverslips (typically, the top coverslip in an inverted microscope) relative to the other (see Methods). The spherical beads ensure that the coverslips remain perfectly parallel during this motion. Examples for materials appropriate of the spherical beads include silica, various types of glasses, moulded polymers such as polystyrene, PDMS, PEGDA, agar, etc. While not preferable due to scattering or fluorescence, beads can also be made of metals such as gold, silver, semiconductors, quantum dots, etc.

Figure 1B:
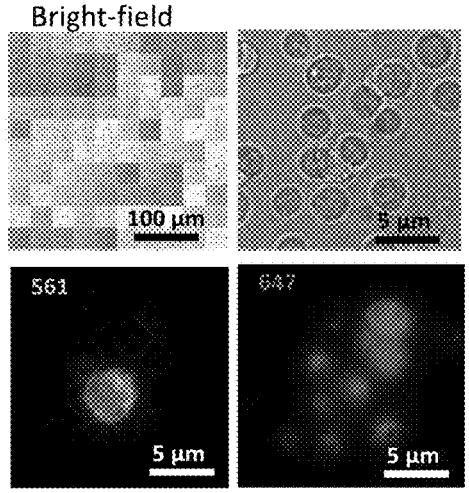

To demonstrate this approach, the inventors have imaged live T/APC conjugates on the opposing coverslips (FIG. 1B). In this experiment, the conjugates used were CD8+ T cells and T2 hybridoma cells loaded with the activating peptide NY-ESO-1. Twenty-four hours prior to the experiment, T2 hybridoma cells were treated with NY-ESO-1 peptide for MHC-I loading. Two types of glass surfaces were prepared: glass chambers (iBidi #1.5), and small glasses that fitted the opening of the chamber well (we refer to both as either coverslips or opposing surfaces). Both of the surfaces were cleaned and treated, and subsequently coated with adhesion antibodies. Throughout this study used the following antibodies: purified mouse anti human CD45 (Bactlab Diagnostics, PMG555480) and mouse anti human CD11a (BD Pharmingen, 555378) for cells' attachment: none of these elicit stimulation through the TCR. On the day of experiment, CD8+ cells and T2 (pre-loaded with peptide) were labeled with different synthetic colors as described in each experiment. Each cell type was attached to a different glass surface. Usually T2 cells were attached to the chamber (i.e. the bottom plane), whereas CD8+ T cells were attached to the small glass (i.e. the upper plane). Attachment was conducted at 37° C. for 20 minutes. Just prior to imaging, the small glass coverslip was placed (upside down) into the chamber. The coverslips were separated by spacers of effective spacing length of about ~20 μm (Corpuscular, 147148-10) that served well for separating the opposing surfaces and for the formation of contacts parallel to the coverslips. The CD8+ T cells engaged the T2 cells, the TCR and MHC-I-NYESO-1 peptide interaction caused T cell activation resulting in the killing of the T2 cells (see below). For fluorescence imaging of the two cells, the plasma membrane (PM) of the CD8+ cells was stained for αCD45 with Alexa647 (red) and the PM of the T2 cells was stained using DPEE-Atto561 (green).

Figure 1C:
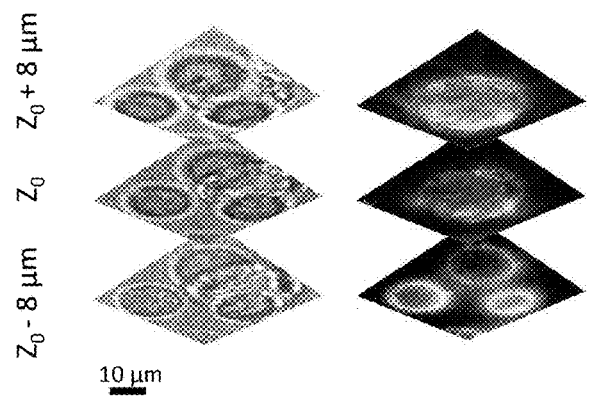

An initial large-scale microscopy imaging was used to efficiently search for cell conjugates. This includes image acquisition from a grid of 100 fields of view (FOVS; specifically, a grid of 10×10 FOVs, each 80 μm²). Imaging included both bright-field and fluorescence imaging in the two spectral channels that matched the cells' staining (FIG. 1B: also see FIG. S1). Imaging was routinely performed in 3 different z-sections (FIGS. 1C and S1), to make sure that both the T cells and APCs are present.

Figure 1D:
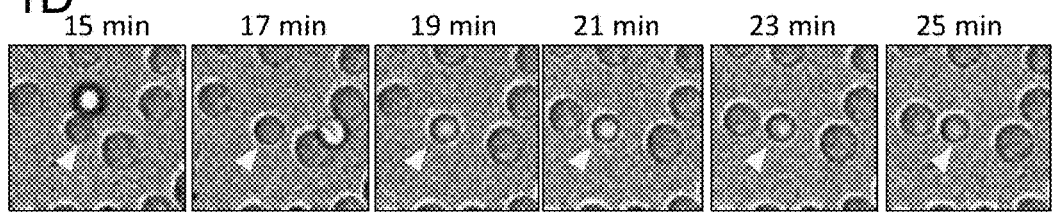
Figure 1E:
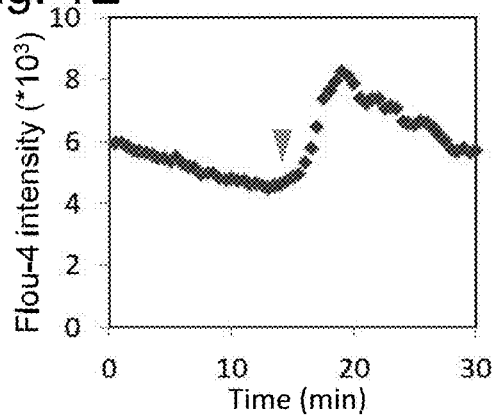
Figure 1F:
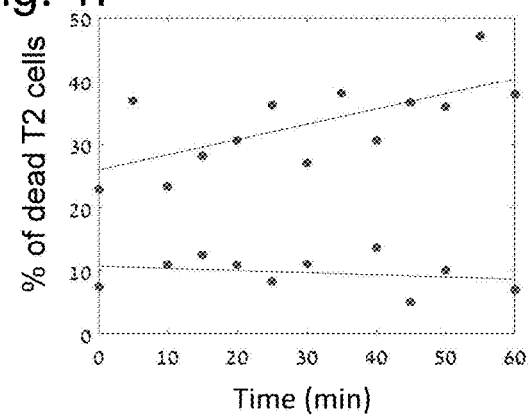

Importantly, the inventors of the present technique validated that the cells could indeed create a functional synapse under the experimental conditions imposed by our assay. For that, the inventors have tested the T cell activation and killing of the APCs, carrying the cognate peptide antigen (see Methods). The inventors first stained the CD8+ T cells with Fluo-4 and imaged the intracellular $Ca^{++}$ levels in these cells upon engagement with the APCs (FIG. 1D). Indeed, robust $Ca^{++}$ influx was detected shortly after the engagement of the T cells and an APC (FIGS. 1D and 1E). This further shows that the CD8+ T cells could efficiently kill the T2 cells loaded with the cognate peptide, as compared to T2 cells that were not loaded with these peptides (FIG. 1F). Thus, such cells demonstrated expected and productive T cell functional responses upon encounter with APCs carrying cognate antigens and may be selected for further use based on the activity markers and response.

Assessing Alternatives for Super-Resolution Imaging Cell Conjugates

Alternative approaches have been proposed and demonstrated for the visualization of the IS as they form in parallel to the coverslip. The inventors have tested the applicability of two other approaches that potentially allow visualization of multiple conjugates in wide field and in super-resolution.

They first evaluated the applicability of well arrays for capturing one type of the cells (FIG. S2). In this approach, a micro-patterned well array was moulded in PDMS. The wells trap single APCs and lymphocytes. The immune synapse between the cells is thus aligned in a favorable orientation at the focal plane of a light microscope (FIG. S2A). To fabricate the micro-patterned well traps, they used patterning of a photolithographic mask. The mask was designed to accommodate a range of well sizes and spacing between wells, which subsequently helped to optimize the process of cell trapping and imaging. Next, they created a template using the mask and photolithography. The template was used to mould the wells in a curable Polydimethylsiloxane (PDMS). Polyethylene Glycol diacrylate (PEGDA) or Agarose can serve as alternatives for moulding the wells. The well arrays were first moulded on Silicon wafers and then transferred onto the coverslips. For imaging, APCs were dropped onto the well arrays. Non-trapped cells were washed using an imaging buffer (FIG. S2B). Using this approach, they imaged single T-cells (AND mouse) conjugated to APCs (B-cells loaded with PCC peptide) in 15 μm well traps with confocal microscopy (FIG. S2C). T cells expressed GFP-actin (green), while B-cells were marked with a non-specific cell marker (red) and both cells were stained with anti-phosphotyrosine antibodies (blue). Distinct features of T cell activation include the formation of microclusters of activated proteins (blue) and an actin ring (green). They could further image the T/APC conjugates in micro-patterned traps using a Leica TCS STED microscope (A top view with maximal intensity projection of a 3D z-stack is presented in FIG. S2D). Here, the interface was between a T cell (Jurkat E6.1: yellow) and a Raji B-cell, pulsed with a super-antigen (SEE) and serving as an APC (red), imaged in cell traps (white). Strikingly, microclusters of the critical adapter protein SLP-76 (yellow dots: stained with Atto647 against pY 128) could be detected at the interface with resolution down to ~70 nm. Still, trials for imaging cell conjugates through the PDMS via SMLM (PALM and dSTORM) were unsuccessful. The PDMS layer created a high background that did not allow proper localization of single emitters.

The inventors noted that the imaging quality is sensitive to the bottom coverslip. Thus, we also tried capturing T cells (Jurkat E6.1) on an upper surface such as porous membranes with holes that match the cell size (FIG. S3A and S3B). While they succeeded in imaging the trapped cells using confocal microscopy (FIG. S3C), these membranes scattered enough light to effectively prohibit effective wide field imaging through either bright-field or fluorescence imaging (FIG. S3D). Notably, confocal imaging could eliminate much of the scattered light, provided that the membrane was used for capturing the upper layer of cells.

The inventors concluded that cell capturing by either well arrays or porous membranes is suitable for confocal and STED imaging, but not for SMLM due to their high background. Hence, they decided to focus on using two opposing coverslips for the rest of this study.

Confocal/STED Imaging of Cell Conjugates Using the Opposing Coverslips Assay

Figure 2A:
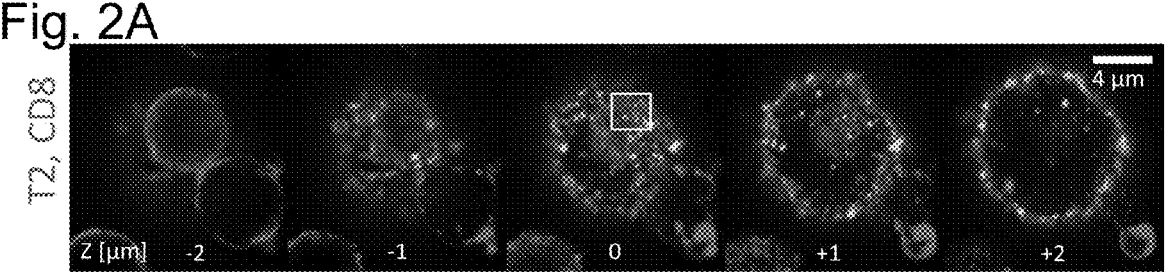
FIGS. 2A to 2F exemplify STED microscopy of $CD8^+$ T cell conjugates with melanoma cells and APCs.
Figure 2B:
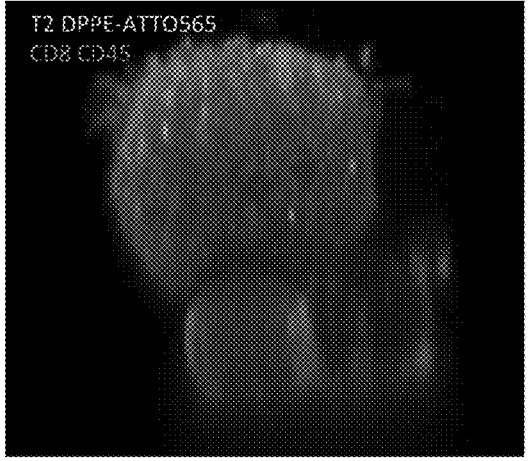

The inventors started by confocal imaging of a fixed interface between CD8+ T cells with T2 APCs that were loaded with the NY-ESO-1 peptide for generating an IS (FIGS. 2A and 2B). Specifically, they imaged the abundant membrane protein CD45 on the CD8+ T cells and the membrane of the T2 cells via DPEE staining. The two-color images clearly show the two cells and their interface in multiple z-sections in steps of 1 μm (FIG. 2A). A side profile is shown in FIG. 2B.

Figure 2C:
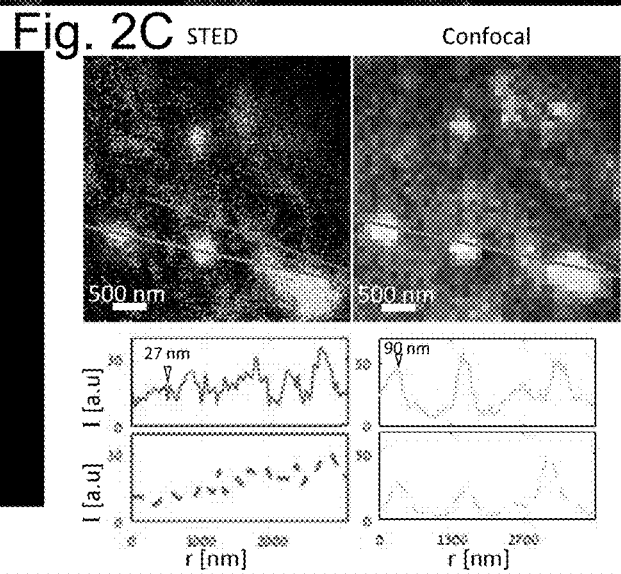
Figure 2D:
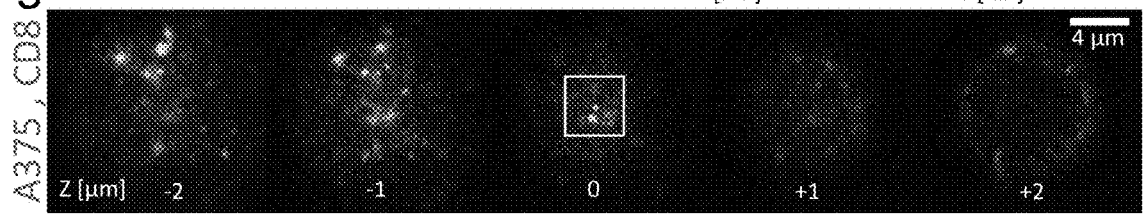
Figure 2E:
Figure 2F:
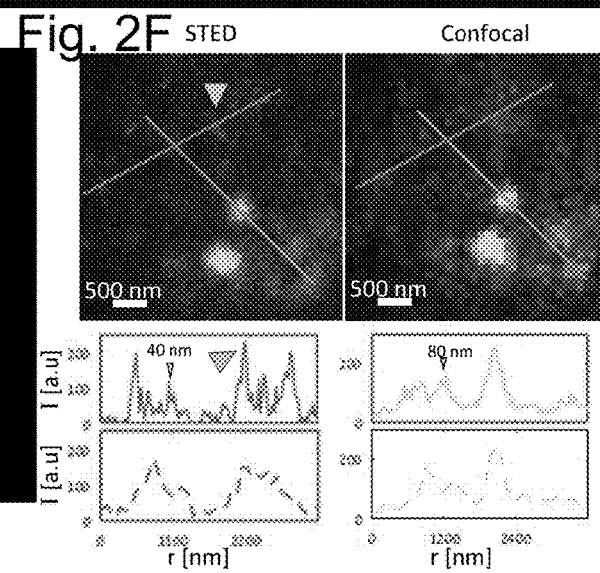

To demonstrate SRM of these interfaces, they also operated the confocal microscope in STED mode (FIG. 2C). This mode could resolve features as small as ~30 nm within the CD8+ membrane (FIG. 2D). They visualized CD45 clusters adjacent to bright ~90 nm membrane patches on the surface of the T2 cells. These patches are cross-sections of cell protrusions that can be clearly seen in panel A.

To check this interface, they also imaged the interaction between CD8+ T cells with melanoma (A375) cells (FIG. 2D). These cells were also fixed prior to imaging and stained similarly to the T2 cells. Here, the interface was less developed in comparison to the IS of the cells with T2 (compare panels A and D). In the melanoma cells, they could distinguish CD45 clusters on the surface of the interacting T cells (arrowheads in panel F).

Thus, the imaging assay can resolve the interface between various cell types using both confocal and STED microscopy, down to a resolution of ~30 nm. Interestingly, the inventors could capture nanoscale CD45 clusters in the CD8+ cells. These clusters were apposed to bright membrane patches (possibly membrane-bound vesicles), at the surface of T2 APCs.

SMLM Imaging of Cell Conjugates Using the Opposing Coverslips Assay

The confocal configuration allows STED to efficiently reject out-of-focus background. However, such background often compromises other SRM techniques that operate in wide-filed, e.g. SMLM. Importantly, our approach eliminates the need for thick coatings on the opposing coverslips, thus greatly reducing background due to scattering of the excitation lasers and optical aberrations. Thus, the inventors next wanted to demonstrate imaging the IS between live T2 and CD8$^+$ T cells via dSTORM. For that they stained the cells with either non-specific membrane stains (DiD and DiO: FIG. 3A) or CD45 (FIG. 3B). Distinct membrane ruffles could be detected at the surface of both T2 and CD8$^+$ T cells. They also visualized the integrins ICAM on T2, and LFA on the CD8$^+$ cells (FIG. 3C). Here, sub-micron domains can be clearly detected at the surface of both cells. Many of these domains, but not all, demonstrated close association across the cell-cell interface. The sub-micron domains shown in FIG. 3C illustrate an effective interface between the cells. Such effective interface can be used as criteria for selection of cells of interest for further use.

This imaging resulted in localization errors of ~25 nm (FIG. S4). Notably, this resolution is comparable to the resolution obtained by total internal reflection fluorescence (TIRF) imaging at the interface of the cells with functionalized coverslips.

Additional approaches have been demonstrated to reconstruct experimental data of fluctuating emitters that is suitable for SMLM. Such approaches include SOFI, its combination with SMLM, and SRRF. Thus, the inventors further tested the performance of these approaches on the same experimental data (FIGS. 3D to 3G), as compared to diffraction-limited imaging (provided by the sum intensity images: FIG. 3D and by SMLM: FIG. 3G). They chose membrane ruffles as our target features (as shown in FIG. 3A). They show that the invented approach also allows ($2^{nd}$ order) SOFI reconstruction of the same data (FIG. 3E), resulting in a spatial resolution of ~100 nm (e.g. smallest features in FIG. S5D), and improved background rejection over diffraction limited microscopy (FIG. 3E, S5A and S5B). SRRF seems to emphasize feature edges (FIG. 3F). SMLM provided the images with the highest resolution (again ~25 nm) and in single molecule detail. A comparison of the reconstructions along line-profiles across distinct features (yellow and pink lines) is provided in FIG. S5C. Background in SMLM reconstruction could be further reduced by synergistically combining SOFI and SMLM reconstruction (FIG. S5D).

Imaging Early IS Formation Between Live Lymphocyte/APC Conjugates

Figure 4:
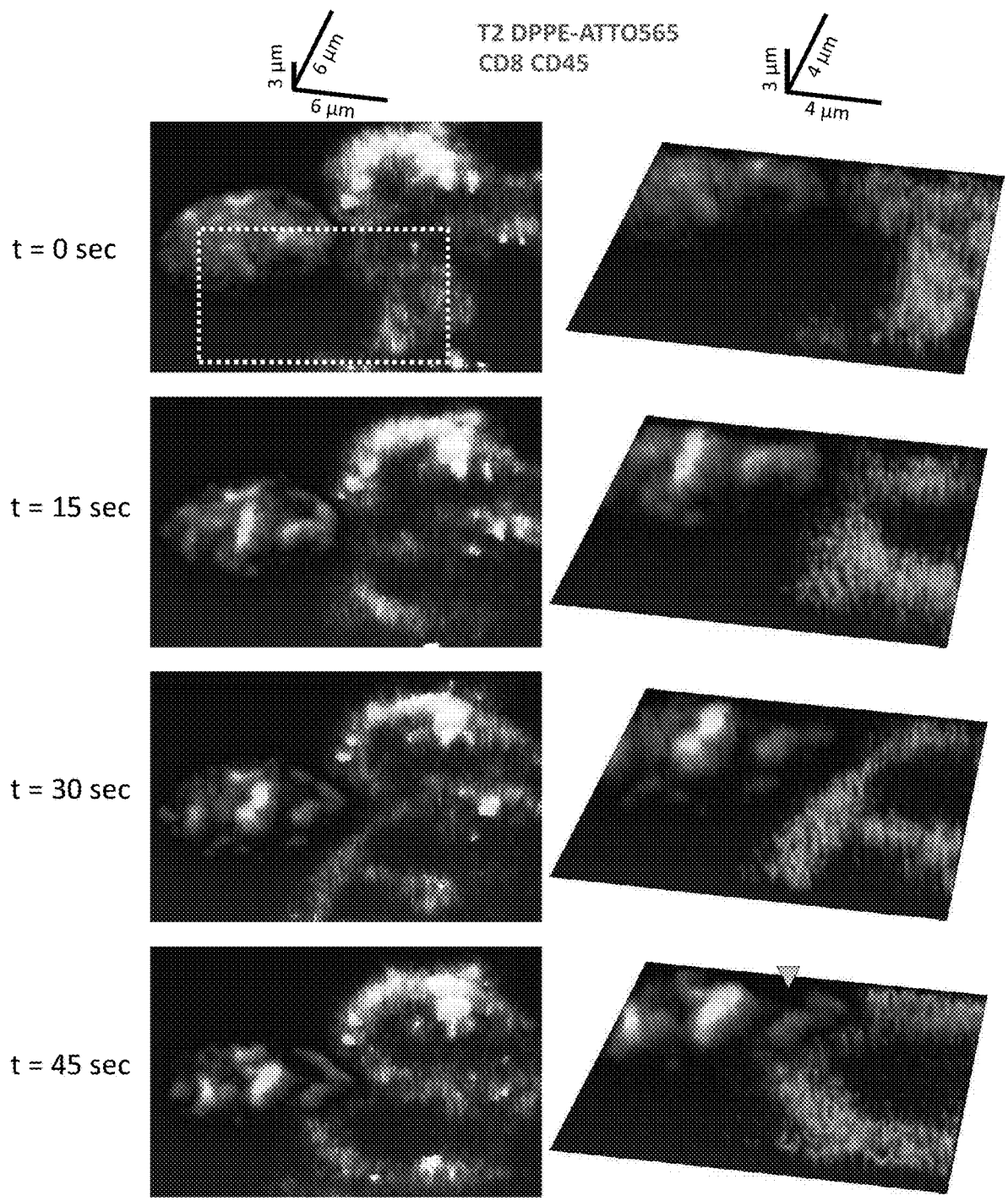
FIG. 4 shows a sequence of Live cell SMLM (dSTORM) imaging of CD8+ T cell interacting with a T2 APCs.

Using the newly developed conjugation techniques, the inventors have set out to image the IS between live T/APC conjugated cells with high-resolution microscopy. Scanning electron microscopy (SEM) images and recent results from our lab indicate that the initial contacts between T/APC conjugates occur via lamellae and cell protrusions. They conducted confocal imaging of the early formation of the IS between T2 (stained with DPEE) and CD8$^+$ T cells (stained for CD45). Their imaging could capture the first contact between these cells through CD8$^+$ T cell protrusions (FIG. 4: yellow arrowhead in zoom image). The temporal resolution of this imaging was 5 seconds per 3D constructed image (15×6×5 μm). The images were oriented for improved impression of the contact evolution over time.

DISCUSSION

High and super-resolution imaging of cell conjugates have been hindered by the inappropriate orientation of the interface in typical microscopy. Here, the inventors developed a simple way to form the interface between the cells in an orientation that is parallel to the coverslip and thus, favourable for fluorescence microscopy. They demonstrate their method by visualizing the IS between CD8$^+$ T cells and APCs (T2 hybridoma cells, loaded with NY-ESO-1 peptides). To verify the compliance of their approach with the physiological formation of the IS and its function, they measured Ca$^{++}$ influx in T cells, and cell killing upon engagement of the APCs loaded with the cognate peptide. SRM imaging could resolve multiple features that were otherwise undetectable (or barely detectable) by diffraction-limited microscopy. Such features included membrane ruffles, nanoscale CD45 clusters and dense membrane domains, closely associating nanoscale integrin domains, and the engagement of APCs by cell protrusions of the CD8$^+$ T cell. Importantly, they demonstrate imaging of the interaction of the CD8$^+$ cells with melanoma (A375) cells, showing the broad applicability of the approach to multiple cell-cell conjugates.

The present technique is compatible with a wide range of microscope modalities. These include wide-field and confocal arrangements, diffraction-limited and super-resolution microscopy, as well as fixed- and live-cell imaging. Imaging covers spatial ranges from large scale microscopy for quickly identifying forming cell conjugates, to single cell conjugates, and even to single molecules at the interface. Super-resolution imaging and reconstruction techniques include STED, SMLM (dSTORM), SOFI, SOF, and SRRF. The spatial resolutions obtained were comparable to imaging of single cells using these techniques. The high resolution of our imaging attest to the lack of optical aberrations and high mechanical stability of our approach. The demonstrated imaging typically includes 2 colours, for distinguishing various molecules and entities on the two interacting cells, but can be easily expanded to more colours.

The inventors also tested alternative approaches that held the potential for wide field super-resolution microscopy, including a cell trapping approach previously demonstrated using confocal imaging. They found that it is compatible with STED imaging, but not with SMLM or other wide-field imaging techniques due to the high background of the capturing apparatus (wells, or porous membrane). The present technique utilizing imaging cell conjugates using opposing surfaces is a newer and relatively simpler approach that is more compatible with wide-field SRM, including methods such as SMLM, SOFI and SIM.

Compared to current cell-trapping approaches, the invented method shows the following advantages: elimination of background and optical aberrations due to thin coatings and very high mechanical stability, which is a particular advantage over the cell traps technique. These properties enable SRM imaging in both confocal (STED) and wide-field (SMLM, SIM, SOFI) configurations. Resolution in all images were comparable to imaging of the interface of the cells with artificial coverslips. While the cells are immobilized on the coverslips, their interacting sides remain free. This eliminates other problems, such as the considerable force applied by optical traps. Furthermore, our approach is simple, low-cost, widely compatible with many cell types, and with various microscopes (without the need for modification). It also shows an increased yield in imagable conjugates in comparison to optical traps. Specialized coatings of the coverslips can serve to optimize the adherence and functional properties of the surfaces, including Poly-L-Lysine, gold beads as fiduciary markers, various antibodies, fibronectin and more.

The inventors expect that the pragmatic use and combination of reconstruction techniques can improve and optimize the super-resolution reconstruction of data collected with our assay. This is especially important when using dim fluorophores and for fast live cell imaging. Moreover, they have recently published a simulation of cell-cell interfaces. Together with the imaging approach presented here, these tools form an effective toolbox for imaging and simulating cell-cell interfaces. For instance, datasets from imaging can be directly plugged into the simulation and serve as constraints or as ground-truth data for hypothesis and prediction testing.

In the context of T cells, early diffraction-limited microscopy has shown striking patterns of molecular organization within the synapse. However, difficulties with imaging cell-cell interfaces have led researchers to develop and employ multiple artificial interfaces to mimic the APCs. Indeed, these interfaces have produced much of our current knowledge about the microscale organization of the IS and its dynamics. These model systems however do not recapitulate the dynamic 3D architecture of the signalling and endocytic complexes in the IS. For instance, there are several key properties of the IS that suggest that it cannot be fully mimicked by model interfaces. First, APCs may actively contribute to synapse formation and regulate the localization of surface molecules. Second, cytoskeletal control of membrane stiffness, shape and movement can generate forces between surface proteins of the interacting cells. These forces, together with the local membrane environment, have been recently shown to markedly influence the affinity of the interactions between the TCR and the peptide-MHC (pMHC) molecules. Third, there are various types of APCs with a number of functional states that differ in their capacity to stimulate lymphocytes. Thus, studying the IS in real cellular interfaces is crucial to our mechanistic understanding of antigen presentation and lymphocyte activation.

Importantly, routine and robust imaging of cell-cell interfaces holds the potential to study and screen for optimal T cells for adoptive immunotransfer for immunotherapy in the clinic. Specifically, signalling by chimeric antigen receptor (CAR-T) and their optimization, or the search for neo-antigens, would greatly benefit from our simple, yet robust and widely applicable imaging approach at the single cell and single molecule resolution. Thus, the invented techniques are expected to become an important tool in the study of such intercellular interfaces for basic research and for clinical applications.

Methods
Sample Preparation

For visualizing conjugated cells in a horizontal orientation, the inventors attached the different types of cells to different glass surfaces that were placed one on top of the other. Twenty-four hours prior to the experiment, T2 hybridoma cells were treated with NY-ESO-1 peptide for MHC-I loading. Two types of glass surfaces were prepared: the iBidi #1.5 glass chambers and small glasses that fit the opening of the chamber well. Both of the surfaces were cleaned and treated according to a previously described technique. Briefly, chambers and small glasses were washed with acidic ethanol at room temperature (RT) for 10 min: liquid was then aspirated and coverslips were dried at 37° C. for 1 hour. Cleaned coverslips were incubated at RT for 15 min with 0.01% poly-L-lysine (Sigma) diluted in water. Liquid was aspirated and coverslips were dried at 37° C. for 12 hours. Coverslips were subsequently incubated with non-stimulatory antibodies at a concentration of 10 µg ml$^{-1}$ overnight at 4° C. or 2 hours at 37° C. Finally, coverslips were washed with phosphate buffered saline (PBS).

DiD, DiO Membrane Staining

The plasma membrane was tagged by incubation of the cells in staining solution containing 10 µM DiD or DiO (Vybrant® DiD Cell-Labeling Solution, Invitrogen, V22887), in PBS for 0.5-5 min. After staining, cells were washed and suspended in imaging buffer.

Immunostaining

Antibodies were used following the manufacturers' protocols. Briefly, 0.5 µg of antibody was added to 500×10$^3$ cells suspended in FACS buffer (90% PBS 10% FBS 0.02% Na-Azide) for 30 min on ice. Then cells were washed twice in PBS and suspended in 1.5 ml of FACS buffer (90% PBS 10% FBS 0.02% Na-Azide) containing 1 µg of secondary antibody. Cells were washed and suspended in imaging buffer (RPMI without phenol red, 10% FBS, 25 mM HEPES). Cells were washed and suspended in imaging buffer (RPMI without phenol red, 10% FBS, 25 mM HEPES) for live cell imaging.

The antibodies used in our experiments include:
Mouse monoclonal IgG1 αCD45-Alexa647 (BioLegend, 304056)
Mouse monoclonal IgG2a αCD11a (LFA1) (BD Pharmingen, 555378)
Mouse monoclonal Anti-ICAM (Abcam, ab2213)
Anti-mouse Atto488 secondary antibody (Sigma-Merck, 62197)
Goat anti-mouse IgG1 (γ1) secondary antibody, Alexa Fluor 647 conjugate (Life Technologies, A21240)

Single Molecule Localization Microscopy

Two-colour dSTORM imaging was conducted both for fixed and live cells. In general, cells were suspended in a STORM imaging buffer which was made by a protocol previously described, and imaging was performed using a TIRF Nikon microscope. Imaging in TIRF mode served to visualize molecules at the PM of spreading cells in close proximity to the coverslip (up to ~100-200 nm). Fluorophores were activated using a low intensity laser illumination at 405 nm (~0.5%), and sequentially imaged in a following frame using laser excitation at either 488 nm, 561 nm or 647 nm. dSTORM acquisition sequence typically took ~2.5 min at 13.4 fps. For two-colour SMLM imaging, we used immunostaining as specified for each experiment.

Large Scale Imaging

To get a quick overview of the sample for later cell-on-cell acquisition, the inventors used large-scale imaging by acquiring grids of about 100 fields of view, with single cell resolution. Imaging was performed using a TiE Nikon microscope (already described for SMLM) using epifluorescent illumination. An area of about 500 µm$^2$ was automatically scanned with consecutive fields of view of 80 µm$^2$ at three different z planes of −8, 0 and 8 µm relative to the focal plane by using a piezo stage control. Moreover, to distinguish between conjugates on the opposing coverslips, cells were stained and imaged in two colour channels in each z-plane. Finally, after reviewing the acquired image, in-depth 3D imaging was performed at the specific x-y coordinates of cell conjugates of interest with high spatial and axial resolution.

Confocal/STED Microscopy

Two-colour confocal and STED imaging were performed using an Abberior STED system (Expert line: Abberior Instruments, Göttingen, Germany) mounted on a TiE Nikon microscope operated by the Imspector software (v0.13.11885; Abberior Instruments, Göttingen, Germany). Samples were imaged with a CFI SR HP Apochromat TIRF X100 NA 1.49 oil immersion objective (Nikon Instruments). Samples were excited with either a 2 mW 561 nm pulsed laser (60 ps) or with a 2 mW 640 nm pulsed laser (60 ps) at 10%. For STED acquisition an additional doughnut-shaped beam depletion laser of 5 mW 770 nm at 18% was applied with a delay time of 1 ns and with width of 20 ns. Reflected light was detected using two APDs with bandpass filter of 570-630 nm and 650-720 nm. The pinhole was set to 1 Airy unit. Samples were scanned across an area of 600×600 pixels, 100 nm$^2$ each for the confocal setup or an area of about 800×800 pixels, 30 nm$^2$ each for the STED setup, with pixel dwell time of 15. Each line was scanned x1 or x2 times (confocal/STED) and the signal was the product of the intensity accumulation. For 3D imaging a piezo stage was utilize to scan the area with 1 μm axial resolution.

Synchronization of Cell-Cell Encounters

Synchronization of cell-cell encounter was primarily achieved by timing when the two opposing surfaces were placed one on top of the other. Further synchronization can be achieved in our assay by sliding the opposing coverslips relative to each other. The spherical beads (diameter 20 μm) placed between the surfaces ensure that they remain perfectly parallel during their relative translation. It is recommended to immobilize the top coverslip and using the translational degree of freedom of the microscope stage (motor or piezo) for sliding the bottom coverslip relative to the top one. Alternatively, the bottom coverslip can remain fixed in position, while a small manipulator can translate the top coverslip (as shown in FIG. 1A). In an inverted microscope (as used throughout this study), the top coverslip can be approached from above. Top lighting might need to be tilted for that, or a small translational stage can be mounted on the upper arm of the microscope. Care should be taken regarding the proper positioning of the lower coverslip (or chamber) on the sample holder, for avoiding variations of height, and thus, relative separation between the coverslips during the translations.

Calcium Assay

For calcium-flux experiments, CD8$^+$ T cells were loaded with Fluo-4AM (Molecular Probes, F10489) at 5 μM for 30 min in the presence of 2.5 mM probenecid. T cells were transferred to imaging medium (RPMI without phenol red, 10% FBS, 25 mM HEPES) and allowed to adhere to the non-stimulating coverslips. Engagement with T2 cell previously loaded with a cognate peptide, lead to T cell activation. The inventors quantified Fluo-4 responses by determining the average intensity of a region within each cell as a function of time using the ImageJ program (NIH).

Killing Assay

T2 cells were 24 hours loaded with peptide NYESO-1 or DMSO (as a control). On the day of experiment, T2 cells were also labeled with DiD. Mixing of CD8$^+$ T cells and T2 cells started the experiment. At several time-points, T2 (fluorescent) cells were counted using Trypan blue staining for dead/live differentiation.

Statistical Analyses

All statistical analyses were conducted using a T-test (assuming two-tailed distribution and two sample unequal variance), unless otherwise mentioned.

Data Processing

Data acquired by SMLM was analysed by the N-STORM module in NIS-Elements (Nikon) or a previously described algorithm (ThunderSTORM) for the identification of individual peaks and group them into functions that reflect the positions of single molecules. Next, peaks were grouped and assigned to individual molecules for rendering. Peak grouping used a distance threshold and a temporal gap to account for possible molecular blinking. For fixed cells experiments, a temporal gap of ~50 msec and a distance threshold of 20 nm were applied for each fluorophore separately in order to minimize possible over-counting of molecules. Drift compensation and channel registration were performed using dedicated algorithms in the ThunderSTORM software. For live cells experiments no drift compensation was applied and a distance threshold of 20 nm was taken (regarding time gaps, each image in a live experiment accumulates 2-2.5 sec of acquisition time as will be describe next). Calibration was conducted using 100 nm Tetraspec fluorescent beads (Invitrogen). Three-dimensional decoding was performed using Nikon NSTORM software. Individual molecules are presented in dSTORM images with intensities that correspond to the probability density values of their fitted Gaussian with respect to the maximal probability density values detected in the field.

To generate a frame in a live cell imaging sequence, accumulation of 200 frames of an SMLM movie with a frame rate ranging 80-100 fps was acquired, with alternating acquisition of the green and red channels. Thus, each image represents 2-2.5 sec of SMLM acquisition time. The images were assigned the frame time of the first participating frame from the SMLM movie (e.g. the presented frame for 2 sec consists of frames accumulated between 2 and 4 sec). These accumulated frames were further used to generate movies of the cell spreading.

Figure 5:
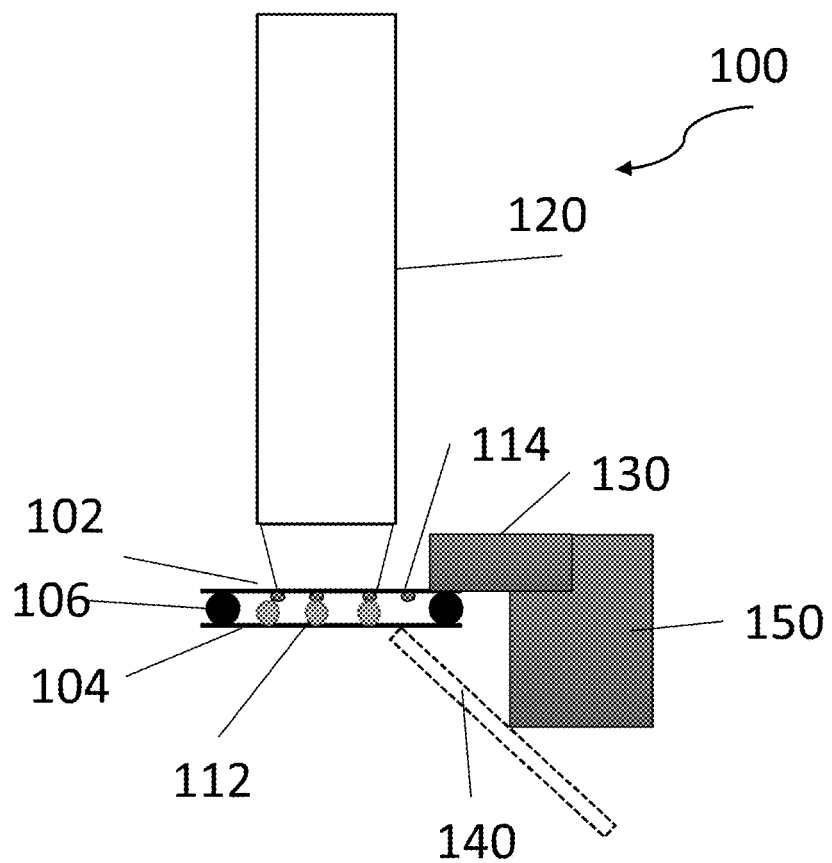
FIG. 5 exemplifies a system for use in imaging of cell-to-cell interface according to some embodiments of the present technique.

Reference is made to FIG. 5 exemplifying a system 100 for use in imaging of cell to cell interactions. The system includes a microscopic imaging unit 120 configured as optical microscope, scanning microscope, fluorescence microscope or any other suitable imaging unit capable of imaging single cell at high resolution. The microscopic imaging unit is configured to define a sample mount suitable for placing a sample for imaging. The sample mount may be integral with the microscopic unit 120 or separated therefrom. The sample mount may be associated with one or more sample translation motors configured to provide selective internal degree of freedom for translation of a sample being inspected. The sample mount is configured for holding arrangement of first 102 and second 104 plates, e.g. coverslips or other surfaces, such that the microscopic unit 120 provides imaging of a plane located between the first 102 and second 104 plates. As indicated above, the first plate 102 is transparent to light used for imaging. The second plate 104 may be transparent, semi-transparent or absorbing, and is preferably selected to have minimal to no reflection in the respective wavelength range. The system further includes a relative translation module 130 configured for selectively shifting one of the first and/or second plates with respect to the other. This relative translation enables shifts of one of the transparent plates (coverslips) to align selected pairs of cells and form interface surface between selected cells. Additionally, in some configurations, the system 100 may include a control unit 150. The control unit 150 is adapted for receiving and processing image data collected by the microscopic unit, and for determining data on one or more cells in the sample based on imaging of cell-to-cell interface. The control unit may also be adapted for controlling the relative translation module 130 and the cell obtaining module 140 described herein below. The control unit 150 may be configured as a computer system including one or more processors, memory, input and output communication ports etc.

In some embodiments, the system further includes a cell obtaining module 140, e.g. formed as mechanical spatula, suction tube or any other mechanical means enabling removal of chosen (individual or multiple) cells from the respective transparent plate (102 or 104). In some embodiments, individual cells can be selected on either of the coverslips (102 or 104). Selection is based on their imaged interface (as explained below). The cells are then selectively released from the surfaces. The cells are collected via local or global aspiration. In an alternative embodiment, the cells are accessed on the coverslips after their physical separation. Chosen cells are identified based on grids or other fiduciaries that appear on the coverslips. They are further removed from the surfaces by mechanical forces (e.g. spatula, pipette, or contact with another selectively adhering surface) or chemical treatment (e.g. local trypsin treatment or photo-disruption of adhesive molecules). The removed cells can then be collected by aspiration.

As indicated above, first cell sample 112 is provided on first transparent plate 102, and second cell sample 114 is provided on second plate 104. The transparent plates are placed to face each other, while separated by one or more spacer particles or beads 106. The spacer particles/beads 106 are preferably selected as having diameter selected to be equal to sum of diameters of cells of the first cell sample plus diameter of cells of the second cell sample. The spacer may be of spherical shape or cylindrical shape, allowing relative movement of one of the first 102 and second 104 transparent plates with respect to the other and in parallel to surface of the transparent plates (102 and 104).

The arrangement of first and second plates 102 and 104 is typically positioned at a sample mount of the microscopic unit 120, enabling high resolution imaging of interface of cells of the first type and cells of the second type. The first plate is optically transparent to light of wavelength used for imaging. The microscopic unit may be used for imaging selected object plane located between the first and second plates, and to provide adjustment (z-axis adjustments) to identify and optimize imaging of the interface plane.

The translation module 130 may be for example piezoelectric based translation module, configured to selectively shift location of one of the first and second plates with respect to the other. In combination with obtaining and processing image data, this enables selecting specific cells to interface each other, and determining parameters of the interface. For example, cells of a first type may be treated immune system cells, and cells of the second type may be cancer cells. Based on interface parameters, certain immune system cells may be selected as having improved reaction to cancer cells. Such cells may be preferred for additional use in treatment of cancer, e.g. via adoptive immunotherapy.

To this end, the system may further include a cell obtaining module 140. The cell obtaining module may be formed of a suction tube, spatula or other configurations, enabling to selective obtain single cells from the corresponding transparent plate for additional use. The cell obtaining module 140 may be operated based on obtained image data for obtaining one or more selected cells, determined in accordance with parameters of interactions with cells of the other sample.

In some configurations, the present technique may be used as a kit including transparent plates 102 and 104, and a selected plurality of spacers 106. The transparent plates 102 and 104 may be coated by selected coating for promoting cell adhering to the plates. The first and second plates 102 and 104 may be coated by the same of different coating type in accordance with cells to be adhered thereon. In some embodiments, the spacers have identical diameters suitable to the sum of diameters of selected target cells for which the kit is indented (optionally for which the coating of the slips is intended). In some other embodiments, the kit comprises spacers of varying diameters, each diameter contained in a specific container, so that the user may select the spacer bead sized based on the combined diameter of the desired first and second type of the interacting cells Optionally the kit also contains a control unit 150 that allows processing of imaging and enables selection of one or more cells in accordance with collected image data indicative of cell-to-cell interface structure. The control unit 150 may be configured for collecting and processing the imaging data. The processing may include analysis of parameters related to the cell-cell interfaces and of resultant cell state or function. The control unit 150 may further be configured to be connectable to a cell obtaining module (e.g. 140) and translation module 130 for operating the translation module and cell obtaining module for isolation of the cells (or its virtual selection and highlighting for selection at the end of the imaging assay). The control unit may then shift the imaging field of view and/or the relative translation of the coverslips for subsequent and iterative imaging. The kit may optionally contain instructions for use.

Figure 6:
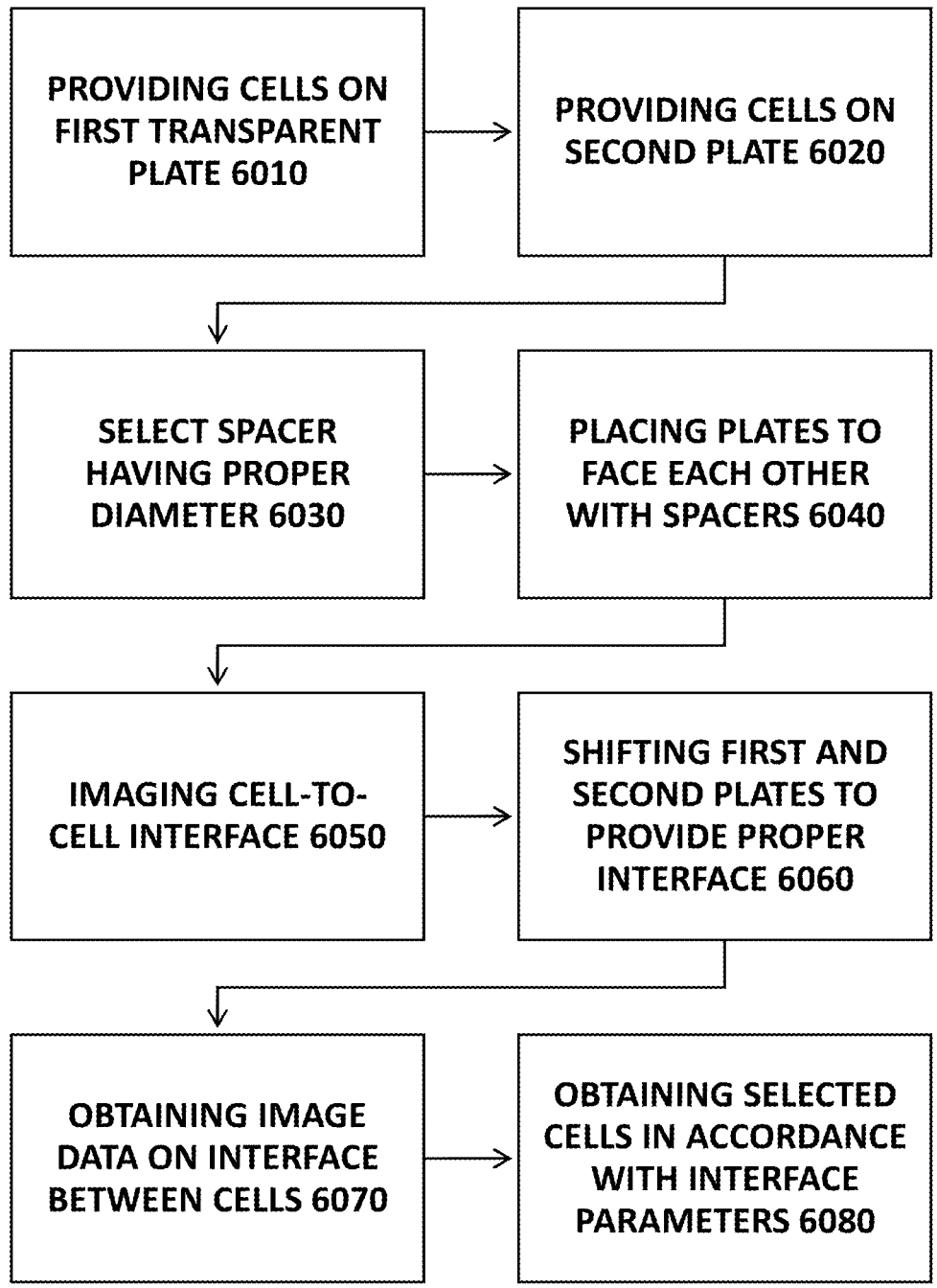
FIG. 6 exemplifies a method for imaging cell-to-cell interface according to some embodiments of the present technique.
Figure 7:
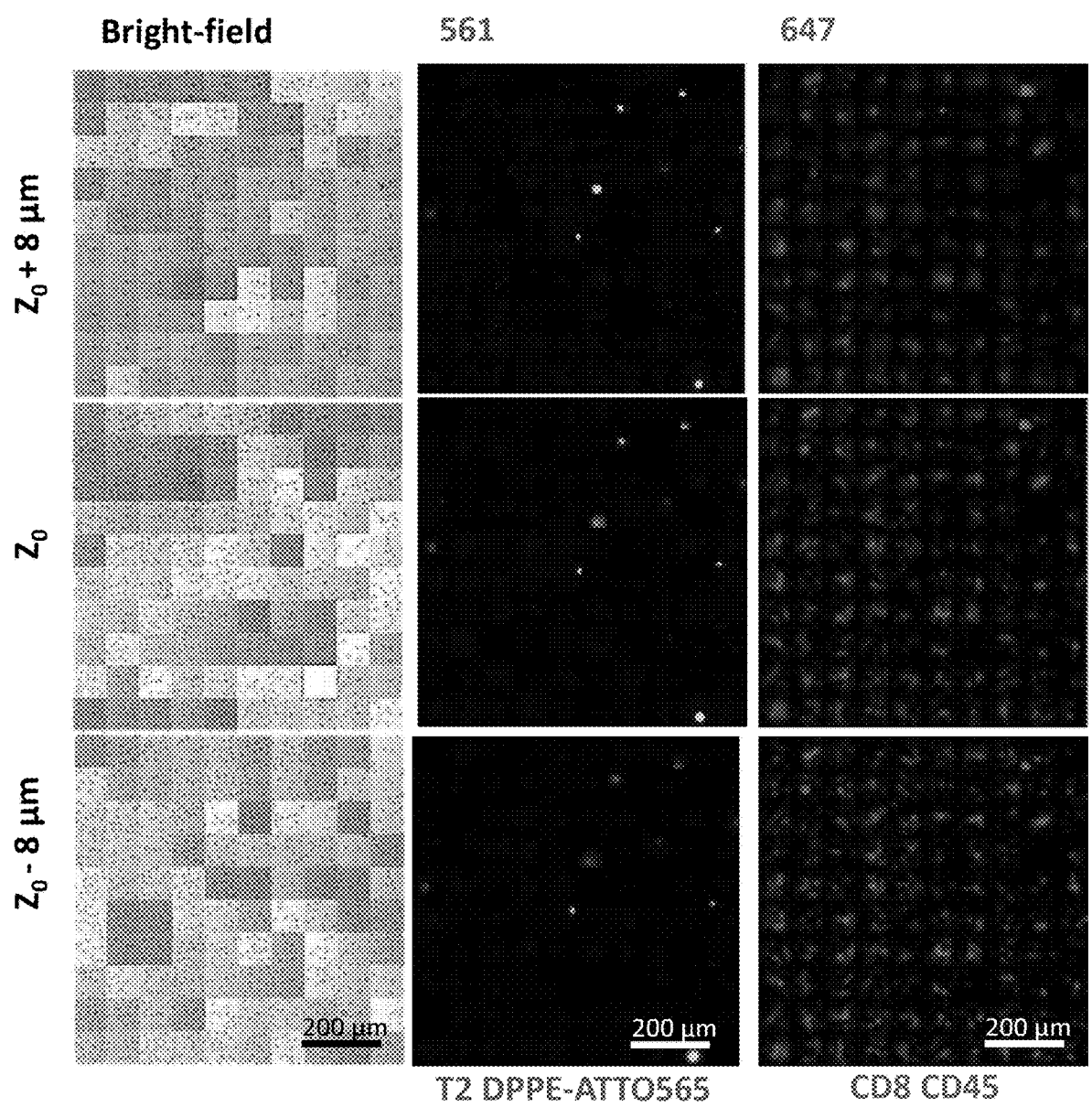
Figure 10:
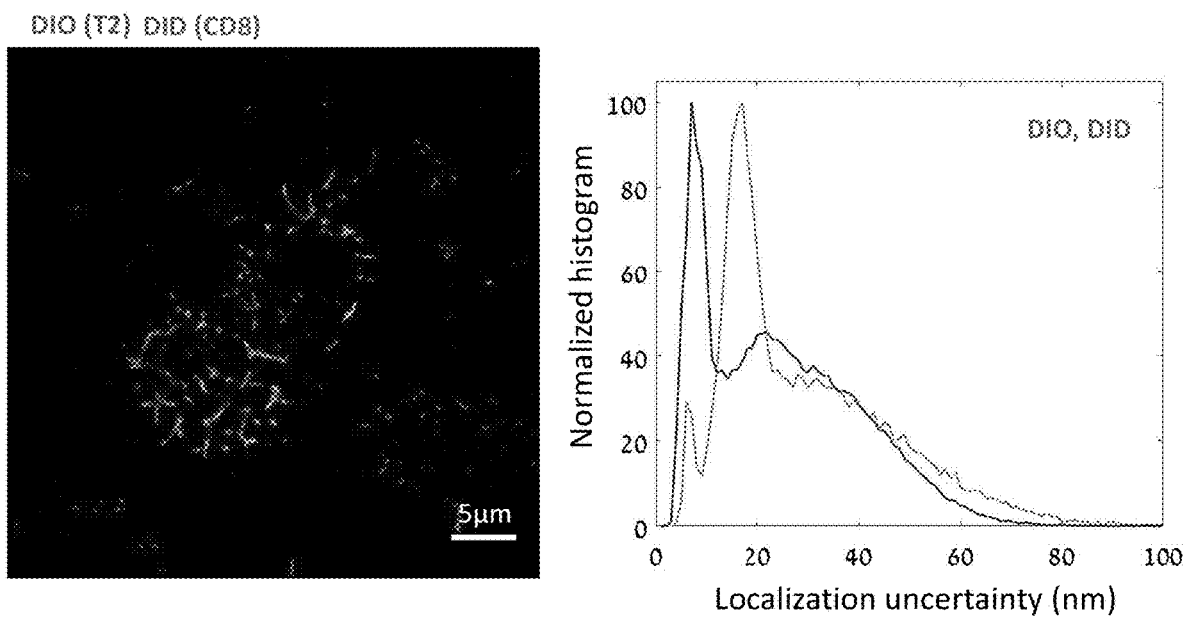

Reference is made to FIG. 6, exemplifying operation of the present technique. As exemplified, the present technique utilizes providing cells of first type on a first transparent plate 6010 and providing cells of a second type on a second plate 6020. Selecting proper spacers 6030 based on diameters of the cells of the first and second types. The spacer diameter is preferably equal to sum of diameters of the cells of the first and second types, to avoid strain on the cells during imaging. Placing the transparent plates to face each other with spacers between them 6040. More specifically, the selected spacers are placed on one of the plates, on similar surface as the cell sample, and the second plate is generally placed on the spacers, such that the surfaces carrying cell sample of the first and second plates are facing one another.

The arrangement of transparent plates is placed in a microscopic imaging unit for imaging 6050 of cell-to-cell interface. Generally, the microscopic unit is directed for imaging of a plane located between the first and second plates, and the plane is adjusted based on image data to a plane defined by interface between cells of the first and second types. The first and second plates may be shifted with respect to one another 6060, in order to optimize interface of selected cells, and/or in order to selectively inspect interactions between different cells of each sample. The microscopic system is used to obtain image data, generally high-resolution image data, of the interface between the cell 6070. Optionally, multiple additional planes relative to this interface can be imaged. The image data may be processed in various techniques for determining selected interactions parameters between the cells.

For example, a plurality of immune system cells may be provided in one sample, and the technique may be used for inspecting interaction of the immune system cells with selected cancer cells. The technique enables determining parameters of interactions of single immune system cells with the selected cancer cell based of image data indicative of interface between the cells. In such techniques, some of the immune system cells, e.g. cells that show efficient interaction with the cancer cells, may be further removed 6080 from the transparent plate for additional use such as medical treatment of a patient. Thus, the present technique provides a scheme for high resolution imaging of cell-to-cell interface. The technique enables selective inspections of interface between selected single cells and providing desirably high-resolution imaging of the interface plane. The invention is based on the inventor's understanding of transverse or axial resolution capabilities in diffraction-limited microscopy and in super-resolution microscopy. More specifically, the present technique enables placing cells in the sample while providing that plane of interface between cells is perpendicular to general optical axis of a microscopic system used for imaging the cells. The technique may further be used for actively selecting cells in accordance with single cell interaction parameters. Such selected cells may be further used for cultures, treatment and various medical research uses.

The invention claimed is:

1. A method for use in imaging biological material, the method comprising:
   providing first sample comprising at least a first type of biological cells on a first transparent plate;
   providing second sample comprising at least a second type of biological cells on a second plate;
   placing said first transparent plate facing said second plate such that cells of the first sample are directed toward the cells of the second sample; providing said first and second plates facing each other in a microscopy system for collecting one or more microscopic images indicative of interface or interaction between at least one cell of the first sample and at least one cell of the second sample;
   providing one or more spacers between said first and second plates; said one or more spacers having an average diameter selected in accordance with sum of effective diameters of biological cells of at least the first and second types;
      wherein said one or more spacers have substantially spherical shape, said spacers being configured for use as bearings, thereby allowing parallel relative translational shift of the first and second plates;
      wherein the method further comprises varying relative translational location of said first and second plates to thereby electing specific cells of the first type interfacing or interacting with specific cells of the second type.

2. The method of claim 1, wherein said one or more spacers are mixed with one of said first and second biological cells, prior to their placement on the plate, the method further comprising fixing or placing the mixture of the spacers and said first or second biological cells onto the first or second plate, respectively.

3. The method of claim 1, further comprising processing said one or more microscopic images associated with one or more selected cells, determining one or more target cells having selected interaction parameters, and obtaining said one or more target cells for further use.

4. The method of claim 1, comprising placing or immobilizing the first type of biological cells on said first plate and immobilizing the second type of biological cells on said second plate;
   wherein at least one of said first and second plates is formed with pores for capturing or accommodating said first or second biological cells.

5. A system comprising:
   a kit comprising:
      a first transparent plate and a second plate;
      one or more spacers having selected diameter, said kit is adapted for use in imaging interface or interaction of biological cells;
         wherein diameter of said one or more spacers correspond to diameters of first and second types of biological cells for spacing the two plates for allowing (i) interface or interaction between cells of the first and second types of biological cells and (ii) movement of one of the plates with respect to the other in result to movement of the spacers;
   the system further comprising:
   at least one microscopic imaging unit comprising a sample mount; said sample mount being adapted for mounting an arrangement comprising said first transparent plate and said second plate separated by said one or more spacers;
   a translation module adapted for selectively shifting said second plate with respect to said first transparent plate, thereby enabling selective imaging of interface or interaction between regions of first and second samples positioned on the first and second plates respectively.

6. The system of claim 5, wherein the kit further comprises first and second types of biological cells to be fixed or placed on the first or second plates, wherein the spacers are mixed with one of the first or second types of biological cells.

7. The system of claim 5, wherein at least one of the first and second plates are formed with pores for trapping or capturing said first or second biological cells therein.

8. The system of claim 5, wherein the kit further comprises instructions for imaging interface or interaction between elements of the first and second types of biological materials.

9. The system of claim 5, further comprising cell obtaining module adapted for selectively obtaining one or more biological cells from said first transparent plate in accordance with image data indicative of interface or interaction between said one or more biological cells of said first sample and biological cells of said second sample.

10. The system of claim 5, comprising cells placement unit for placing or delivering the first and second types of biological cells onto said first and second plates, respectively.

11. The system of claim 5, comprising said first and second plates mounted on said sample mount;
   wherein at least one of said first and second plates is formed with pores for trapping or accommodating biological cells.

12. The system of claim 5, further comprising a control unit for user-defined or automated sequence of performing a method for use in imaging biological material, the method comprising providing first sample comprising at least a first type of biological cells on a first transparent plate; providing second sample comprising at least a second type of biological cells on a second plate; placing said first transparent plate facing said second plate such that cells of the first sample are directed toward the cells of the second sample; providing said first and second plates facing each other in a microscopy system for collecting one or more microscopic images indicative of interface or interaction between at least one cell of the first sample and at least one cell of the second sample, including image acquisition of cell-cell interface or interaction, cells selection, cells isolation and translation of the plates relative to each other, and/or the field of view.

13. A method for use in imaging matter, the method comprising:
   providing first sample comprising first type of matter on a first transparent plate; providing second sample comprising second type of matter on a second plate; placing said first transparent plate facing said second plate such that matter of the first sample is directed toward the matter of the second sample; providing said first and second plates facing each other in a microscopy system for collecting one or more microscopic images indicative of interface or interaction between elements of the first and second types of matters;

providing one or more spacers between said first and second plates; said one or more spacers having an average size selected in accordance with sum of the heights of the first and second types of matters, relative to their respective mounting plates;

wherein said one or more spacers are mixed with one of said first and second matters, prior to their placement on the plate, the method further comprising fixing the mixture of the spacers and said first or second matters to the first or second plate.

14. The method of claim 13, comprising immobilizing the first type of matters on said first plate and immobilizing the second type of matters on said second plate;

wherein at least one of said first and second plates is formed with pores for accommodating said first or second matters.

15. The method of claim 13, wherein said first and second matters are selected from one of: organic and inorganic matter.

16. The method of claim 13, wherein the interface of interaction is selected from any one of: 3D shape or arrangement of each of the interacting cells, dynamic changes in this shape before, along and after the interaction, the organization and shape of subcellular organelles and entities within the cells, organization of molecules within the cells and on their surface, changes in cell metabolism, cell mobility and arrest upon interaction.

17. A method for use in imaging matter, the method comprising:

providing first sample comprising first type of matter on a first transparent plate;

providing second sample comprising second type of matter on a second plate;

placing said first transparent plate facing said second plate such that matter of the first sample is directed toward the matter of the second sample;

providing said first and second plates facing each other in a microscopy system for collecting one or more microscopic images indicative of interface or interaction between elements of the first and second types of matters;

wherein the interface of interaction is selected from any one of: 3D shape or arrangement of each of the interacting cells, dynamic changes in this shape before, along and after the interaction, the organization and shape of subcellular organelles and entities within the cells, organization of molecules within the cells and on their surface, changes in cell metabolism, cell mobility and arrest upon interaction.

* * * * *